Nov. 18, 1969  F. R. ELEVITCH  3,479,265
THIN FILM APPARATUS AND METHOD FOR ELECTROPHORESIS, CHEMICAL
AND BIOCHEMICAL ANALYSES AND THE LIKE
Filed Aug. 29, 1967  4 Sheets-Sheet 1

INVENTOR.
FRANKLIN R. ELEVITCH

BY *Gregg & Stidham*
ATTORNEYS

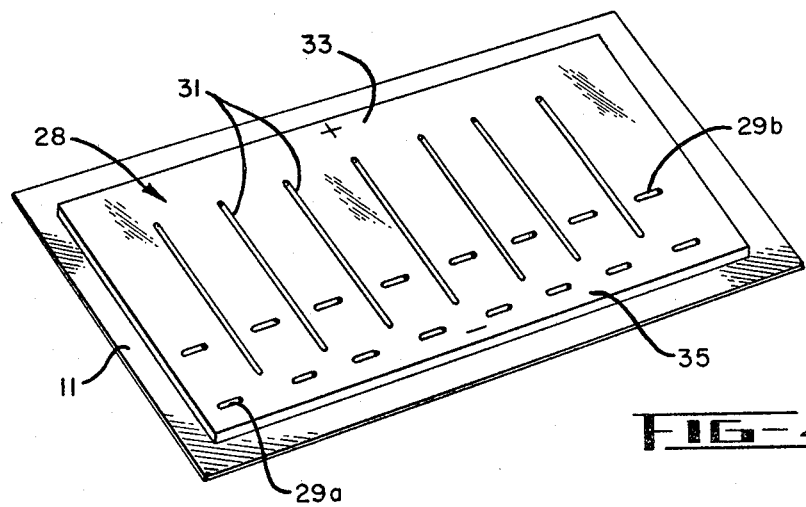
FIG-4
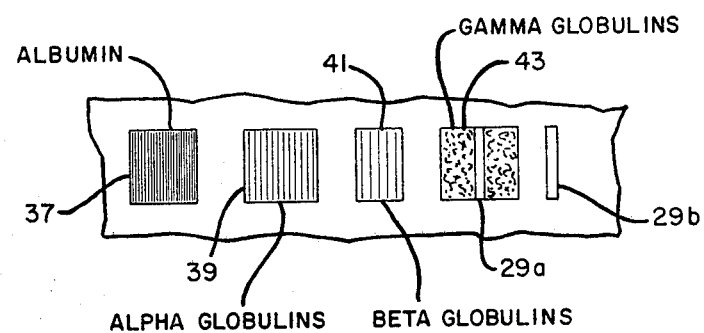
FIG-5
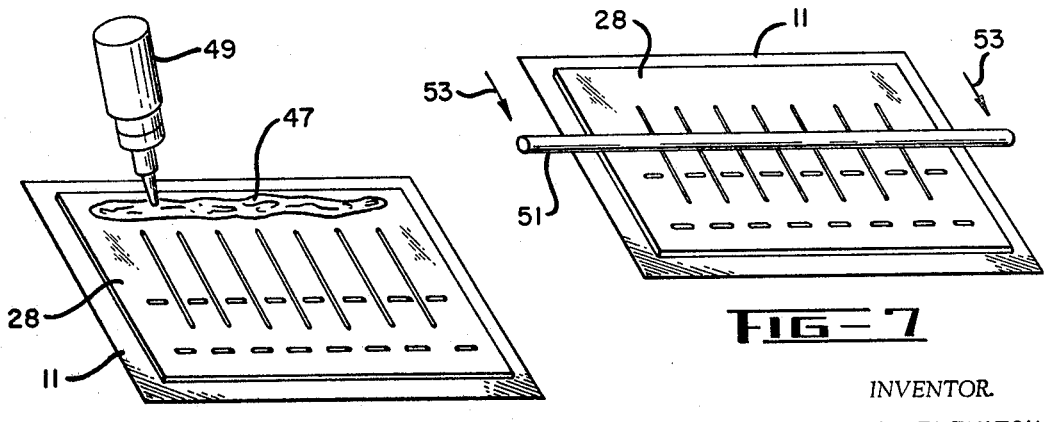
FIG-6
FIG-7
INVENTOR.
FRANKLIN R. ELEVITCH
BY *Gregg & Stidham*
ATTORNEYS Nov. 18, 1969 F. R. ELEVITCH 3,479,265
THIN FILM APPARATUS AND METHOD FOR ELECTROPHORESIS, CHEMICAL
AND BIOCHEMICAL ANALYSES AND THE LIKE
Filed Aug. 29, 1967 4 Sheets-Sheet 3

*INVENTOR.*
FRANKLIN R. ELEVITCH

BY Gregg & Stidham
ATTORNEYS

INVENTOR.
FRANKLIN R. ELEVITCH

United States Patent Office 3,479,265
Patented Nov. 18, 1969

3,479,265
THIN FILM APPARATUS AND METHOD FOR ELECTROPHORESIS, CHEMICAL AND BIO-CHEMICAL ANALYSES AND THE LIKE
Franklin R. Elevitch, 476 Ferne Drive, Palo Alto, Calif. 94306
Continuation-in-part of applications Ser. No. 300,341, Aug. 6, 1963, and Ser. No. 579,089, Sept. 13, 1966. This application Aug. 29, 1967, Ser. No. 664,133
Int. Cl. B01k 5/00
U.S. Cl. 204—180
11 Claims

ABSTRACT OF THE DISCLOSURE

The apparatus employs a thin film of permeable gel into which chemical reagents or biological fluids such as blood serum and proteins can diffuse. The film has a thinness of not more than about one millimeter or less and it is characterized by uniformity of thickness such that voltage gradients and current densities through the film are uniform when it is used as an electrophoresis medium and such that diffusion of chemical reagents or of biological fluids into the film occurs uniformly. The thinness of the film allows rapid dissipation of heat when the apparatus is employed for electrophoresis and it economizes on the use of chemical or biological reagents which are incorporated in the film. The apparatus may be supplied by the manufacturer to the user as a two-piece mold having a first section to which the gel is adherent and a second section to which the gel is non-adherent. When the customer is ready to use the film, the first mold section (to which the thin film of gel is adherent) is stripped from the second section, thus exposing the thin film supported on the first mold section. This film may be formed with wells for the introduction of reagents, unknown specimens, or the like.

This application is a continuation-in-part of my copending application Ser. No. 300,341 filed Aug. 6, 1963, now abandoned, entitled "Thin Layer Gel Electrophorectic Couvette and Method of Electrophoresis" and Ser. No. 579,089, filed Sept. 13, 1966, now abandoned, entitled "Method for Molding a Film of Gel and Method of Analyzing Electrophoretically Separated Materials in the Gel."

The present invention, like that of Ser. No. 300,341, relates to the use of thin films of permeable gel-like material for electrophoresis and it employs a simplified type of apparatus for providing such films as described in Ser. No. 579,089. The thin uniform films of the apparatus of the aforesaid patent applications and of the present application permit the use of high voltage gradients, for example 15 volts per centimeter and consequent rapid electrophoresis, but without damaging heat buildup and without the need for positive cooling. Heretofore, thick films have been used and, as a result, low voltage gradients have been required (and long periods of time have been required) or positive cooling has been required. The uniformity of thickness of these films provides the advantage of uniform voltage gradients and current densities and consequent reproducibility of results. With thick films as used heretofore, variations of thickness of the order of, say, 0.1 mm. have not been significant, but with films of about 0.5 mm. thickness, such deviations are proportionately much greater and more serious.

In my application Ser. No. 579,089 a simplified apparatus is described which has certain advantages over the earlier apparatus of Ser. No. 300,341; e.g., it is less expensive to manufacture and it lends itself more effectively to manufacture of the entire apparatus including the film at a factory and it avoids the need to form the film at the place of use.

The present application relates to disposable, factory made, thin film equipment of the character described in my application Ser. No. 579,089 and it relates also to improvements upon and variants of that equipment.

Certain forms of the apparatus of the present invention are illustrated by ways of example in the accompanying drawings in which:

FIGURE 4 is an isometric view showing the gel casting on the base of the mold with the mold cover removed therefrom.

FIGURE 5 is a plan view of a single portion of the gel containing a single set of wells and showing the relative positioning of electrophoretically separated material thereon.

FIGURE 6 is an isometric view which is similar to FIGURE 4 but showing the application of a liquid reagent to the gel during a novel process of accurately measuring isoenzymes.

FIGURE 7 is an isometric view which is similar to FIGURE 6 but showing the liquid reagent being spread across the gel.

Figure 1:
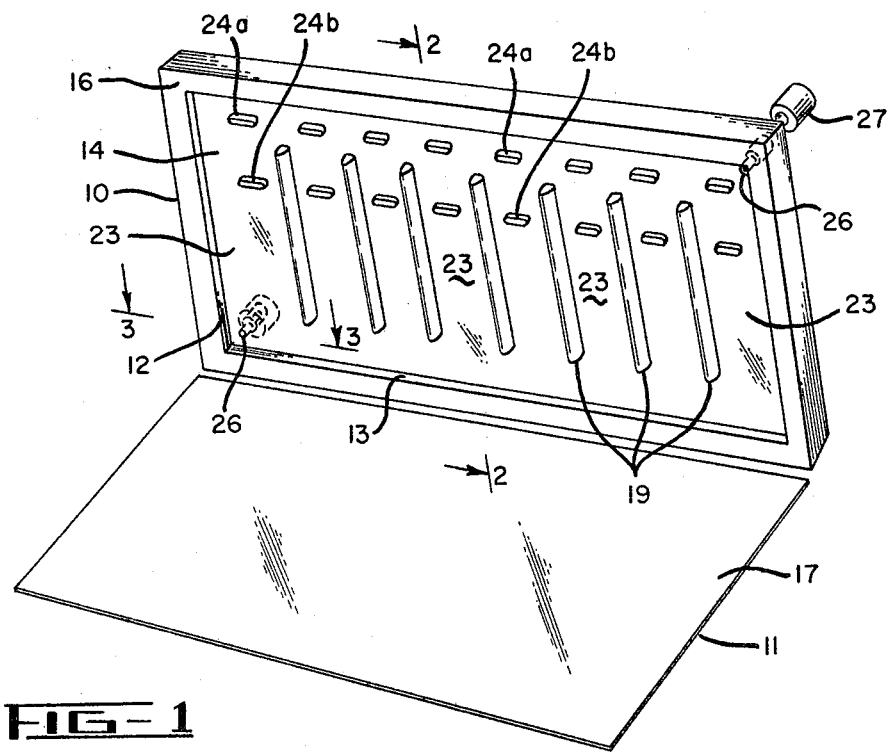
FIGURE 1 is an isometric view of a mold which embodies the invention, and showing the cover removed from the base of the mold.
Figure 2:
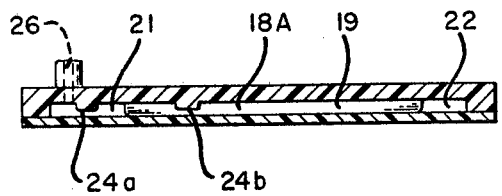
FIGURE 2 is a sectional view taken on line 2—2 of FIGURE 1 but showing the base of the mold with the cover thereon.
Figure 3:
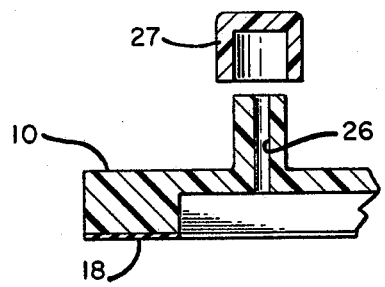
FIGURE 3 is a sectional view taken on line 3—3 of FIGURE 1.

Reference is now made to FIGURE 1 of the drawings wherein one form of novel mold of the invention is shown comprising upper and lower portions or sections 10 and 11, respectively. The lower mold section 11 simply comprises a flat member of generally rectangular shape made of any suitable material such as a transparent high optical clarity, low water-absorbent, low-fluorescent, preferably flexible plastic. The upper section 10 which is formed of semi-rigid, transparent, low water-absorbent, low fluorescent plastic is provided with vertical end walls 12 and side walls 13 to define a rectangular shaped recess 14 in the lower face thereof. Plastic such as polystyrene is suitable for use in forming the mold sections. The base section 11 is of less thickness than the cover 10 whereby the base 11 is relatively flexible and the cover is relatively rigid. The low-fluorescent quality of the plastic base 11 results in a device which may be used in fluorometric analysis, and the high optical clarity thereof enables density measurements with a densitometer. The face 16 of the top mold section 10 is adapted to be placed on and secured to the plane upper face 17 of the bottom mold section 11. The upper and lower sections 10 and 11 are made of substantially the same length and width for easy alignment of the cover 10 on the base 11. Although any suitable means may be used for securing the cover on the base, a non-hardenable water-resistant adhesive 18 is shown. (For purposes of illustration, the adhesive is shown only in the enlarged cross-sectional view of FIGURE 3 and not in the other drawing figures.) As described hereinbelow the adhesive is of the type permitting subsequent removal of the cover from the base. In practice, a rubber-base cement has been found to be satisfactory. Obviously, other suitable cements or means such as pressure sensitive adhesives or heat sealing may be used if desired. With the top mold section 10 attached to the lower mold section 11 a rectangular-shaped cavity or chamber 18A is formed by the recess 14 in the cover 10 and upper face 17 of the base 11 as shown in FIGURE 2.

The top mold section or cover 10 is provided with a plurality of horizontally-spaced, downwardly depending dividing ribs 19, each of uniform distance from the next, all parallel with the end walls 12, and of the same height as the end and side walls 12 and 13. Each of the ribs 19 has its longitudinal ends at a fixed distance from side walls 13 thereby forming channels or passageways 21 and 22 at each end of the ribs 19. The position of the ribs 19 creates a series of uniform sized parallel spaces 23 between each of the ribs, and between the end walls 12 and adjacent ribs.

Well-making ribs 24a and 24b (of identical shape but provided with different reference characters for purpose of description) are also formed in the recess 14 of the cover, which ribs are of lesser height than the dividing ribs 19. For example, they may be approximately one-half the height of the dividing ribs. The well-making ribs 24a and 24b are spaced longitudinally in pairs, and in the illustrated embodiment, one well-making rib 24a of each pair thereof is located in the passageway 21 and the other well-making rib 24b of each pair is formed within one of the parallel spaces 23. In a modification of the invention, the ribs 24a also could be spaced to fit within the parallel spaces 23.

In use, a suitable release agent such as a silicone compound (not shown) is applied to the recess 14 of the top section 10, and a suitable adhesive 18 is applied to the face 16 of the mold cover 10. The cover 10 (to which the gel adheres by capillarity) is then placed on the mold base 11 with the face 16 and the dividing ribs 19 in engagement with the base 11. The cover and base are preferably clamped together to assure the formation of a cavity 18A of uniform thickness.

It is important that the layer of gel formed by the apparatus be uniform in thickness. The base 11 is flexible, hence subject to distortion and the more rigid cover 10 may depart from flatness because of limitation of manufacturing techniques. However, the end walls 12, the side walls 13 and the ribs 19 are of uniform height. Therefore when the apparatus is placed in a press the mold cavity 18a, hence the layer or film of gel produced in this cavity, have a very uniform thickness.

The cover 10 is provided with filling and air vent passageways or openings 26 for filling the mold, which openings may be closed by caps 27. The mold is filled with a suitable medium for electrophoresis such as aqueous solutions of agar, agarose, starch, acrylamide, or the like, through one of the openings 26, which medium except acrylamide is introduced as a heated liquid but assumes a solid form when cooled. Acrylamide is introduced at room temperature and is polymerized in the mold by use of a catalyst such as light or a chemical catalyst. Such solutions are well known. The solution passes along the channels 21 and 22 and between the ribs 19 to fill the entire mold cavity 18A including the spaces 23. The solution is then hardened to form an electrophoresis gel (shown in FIGURE 4 and identified by the reference character 28). The caps 27 are applied to the mold for storage of the gel in the mold until ready for use.

Prior to filling the mold, the recess 14 and the ribs 19 and 24 formed in the recess are coated with a suitable release agent. No release agent is applied to the base 11. After the mold is filled and the gel is hardened, the flexible base 11 with the gel 28 adhered thereto simply is peeled off the cover for use. A plurality of uniformly spaced parallel rows of wells 29a and 29b are formed in the gel 28 by the well-making ribs 24a and 24b, respectively. The wells 29a and 29b are extremely thin, on the order of 0.002±0.001 inch in width, and are about 0.006±0.001 inch in depth. In one embodiment a gel layer of about 0.015±0.001 inch thick has been used. A thin gel layer is desired to permit use of relatively high voltage gradients, of about 15 volts per centimeter, without destructive heat build-up. The wells are filled by means of thin capillary tubes with a measured amount of material, each well being filled by capillary action to its volume, and with a uniform amount.

The gel 28 is also formed with a plurality of parallel slots 31 which extend through the film, which slots are formed by the dividing ribs 19. These slots facilitate cutting the gel into uniformly sized strips for examination following the electrophoresis process. Also, the slots 31 may be filled with antiserum when the gel is employed in an immunoelectrophoresis process. As best seen in FIGURE 1, the lower edges of the ribs 19 are curved for line contact with the face 17 of the base, whereby the slots 31 formed in the gel by the ribs 19 have arcuate shaped walls. The walls of these slots 31 are readily wettable by fluid introduced therein whereby the slots are readily filled. The plastic base 11 is not readily wettable and if the ribs 19 were formed with parallel sides, the resultant slots in the gel would be difficult, if not impossible, to fill. In addition, the ribs 24a, 24b and 19 are all formed with curved edges rather than sharp edges to facilitate removal of the top mold section from the bottom mold section without damaging the gel.

In use, the film of gel 28 on the flexible plastic base 11 is placed on a flat surface such as a desk, counter top, or the like, for loading of the wells 29a and 29b. Biological fluid to be analyzed such as blood serum, is placed in a well or wells. If fewer than eight samples are to be analyzed, the gel and base may be cut, as by a scissors, to the desired length along one of the slots 31, and the unused portion thereof stored in a plastic wrapper until ready for use.

With the well, or wells, loaded, the gel 28 on the base 11 is then placed face down on buffer soaked wicks in an electrophoresis cell of an electrophoresis apparatus. Electrophoresis apparatus which is commercially available and of well known design may be used. Such apparatus, not shown, comprises an electrophoresis cell and a power supply connected thereto. A typical electrophoresis cell is divided into four chambers. Two central chambers have platinum wires running down their centers, and are connected to the outside chambers by cotton or glass wool wicks or filter paper. Opposite edges of the gel film 28, along the long sides thereof, are placed on wicks which dip into the outside chambers of the cell. The power supply is connected to the platinum wires for current flow through the chambers and the gel film 28 thereon.

It is common knowledge that almost all of the inorganic or organic ions in solution which might be placed in the slots or wells will have different mobilities; mobility being dependent upon electrical charge, molecular weight, size, shape, and the like, with electrical charge being the primary factor in electrophoresis. Because the molecules or class of molecules in the inorganic or organic solutions used at any particular time have different mobilities, the molecules of blood serum or virus, or bacteria, as the case may be, will thereby be caused to move a varying distance toward a positive or negative pole of the gel from their starting place in the slots or wells 29a and 29b. In the illustrated arrangement the one edge portion designated 33 of the gel 28 is connected to the power supply anode, and the opposite edge portion designated 35 is connected to the cathode. The electrophoretic separation is preferably performed at a given voltage gradient (e.g., 10–15 volts/centimeter) with a constant current over a predetermined time interval.

One method of electrophoretic analysis which involves the use of both of the wells 29a and 29b is described in my above-identified copending patent application Serial No. 300,341. In the method described in said copending patent application, biological fluid to be analyzed, such as blood serum, is placed in the wells 29b and a suitable antigen solution, such as a bacteria or virus-containing solution, is placed in the adjacent well 29a. The fluid and antigen are subjected to electrophoresis whereupon the fluid is electrophoretically separated for isolation of the antibodies in the gamma globulin fraction. The antigen reacts with the antibodies to form a complex which may be analyzed. For details of this method, reference is made to said copending patent application.

A novel method of quantitative determination of isoenzymes will now be described employing the gel molded by the novel mold of this invention. The method contemplated by this invention employs a sucrose-agarose gel comprising a 10% sucrose, 1% concentration of agarose, solution in a buffered electrolyte solution made up of sodium barbital and hydrochloric acid, pH 8.8, 0.05 M although other buffers of similar pH and ionic strength may be used if the electrolytes are non-fluorescent. This solution is used ecause it is convenient to make and has no autofluorescence. It will be understood that this gel is of the preferred type, but that the method also may be employed with other gels such as starch, agar, acrylamide, or the like.

In use, biological fluid to be analyzed such as blood serum, is placed in a well or wells 29b. A precise amount of such fluid, e.g., one microliter, is placed in the wells. As mentioned above, if fewer than eight samples are to be analyzed the film and base may be cut to desired size.

With the well or wells 29b loaded, the gel 28 on the base 11 is placed in an electrophoresis apparatus for electrophoretic separation of the biological fluid.

An example of a strip of agarose gel after removal from the electrophoresis cell and cutting into strips and showing the distribution of the now separated biological sample into fractions is shown in FIGURE 5. The albumin is shown at 37, the alpha globulins at 39, the beta globulins at 41 and the gamma globulins at 43. Isoenzymes will lie equally spaced between the remote ends of bands 39 and 43. It will be understood, of course, that after the electrophoresis process has taken place, the tracings shown in FIGURE 5 are not visible to the eye unless some coloring or fluorescent solution, or the like, has been added.

The present method contemplates diffusing a reagent, or the like, in solid, liquid or gaseous form through the thin layer of gel to react with the electrophoretically separated sample. The chemical reaction products are then analyzed in the gel. Depending upon the reagent employed, and the reaction obtained, the analysis is by fluorometric, spectrophotometric, radioisotopic, or the like, means. The present method is not limited to the use of any particular reagent, or to any particular chemical reaction between the reagent and electrophoretically separated sample, or to any particular analysis method or apparatus employed in the analysis of the chemical reaction products. However, for purposes of explanation, one embodiment of the novel method is illustrated in the drawings and will be described in detail. In accordance with this one embodiment, fluorescent patterns are developed for precisely and accurately measuring lactate dehydrogenase (LDH) isoenzymes. After electrophoresis of the biological sample, such as blood serum, in the manner described the LDH isoenzymes are incubated with a reagent. A suitable reagent comprises a substrate or a substrate combined with a coenzyme. An example of the latter comprises sodium lactate and the coenzyme, nicotinamide adenine dinucleotide (NAD+), which reagent is simply prepared by mixing the lactate substrate fluid with the coenzyme NAD+. About twenty drops of the liquid reagent are dispensed along the anode side of the electrophoresis gel 28 as shown in FIGURE 6. In FIGURE 6, the liquid reagent 47 is shown being dispensed from a bottle 49 onto the gel 28. The reagent is then spread evenly over the gel. For this purpose, a glass rod 51, or the like, may be employed as shown in FIGURE 7. The rod is placed on the gel at the anode side thereof and pushed across the film of gel 28 in a single smooth motion in the direction of the arrows 53 without pressing down thereon. A film of the liquid reagent is thereby evenly spread over the gel and the excess liquid swept off the opposite edge of the gel.

The LDH isoenzymes are incubated for ten minutes with the reagent by placing the gel on a support above water level in a covered water bath at 37° C., during which time the sodium lactate is converted to pyruvate and the non-fluorescent NAD+ is converted to reduced nicotinamide adenine dinucleotide which is fluorescent. For determination of total LDH, one or more of the otherwise unused outer wells 29a in the gel 28 may be loaded with one microliter of NADH (1 mg./ml.). Preferably, three such wells are loaded with NADH. The gel 28 is then dried in an oven at about 80–90° C. for approximately fifteen minutes. Because of variations in oven convection and ambient humidity, the drying time is empirically determined. In any event, the agarose film must not make contact with hot metal, and preferably, the gel 28 on the base 11 is placed gel side up on several layers of paper towel or filter paper during drying.

The developed LDH isoenzyme sites appear as blue-white fluorescent lines under near ultraviolet light (365 m$\mu$), and the resulting enzymatic reaction products may be analyzed by fluorescence. The gel 28 on the base 11 is cut into individual strips with a scissors, or the like, along the slots 31. The individual strips are analyzed by use of a fluorometer. Preferably, the fluorometer output is connected to a linear recorder for recording the LDH isoenzyme patterns. The percentage of LDH isoenzyme at each site is determined by measuring the peak height of each recorded isoenzyme, and calculating the percent LDH isoenzyme at each site by the following formula:

LDH isoenzyme percent=
$$\frac{\text{Peak height LDH isoenzyme}}{\text{Sum of the peak heights}}$$

The total LDH isoenzyme present in each strip is calculated by use of the following formula:

Total LDH (in micromoles NADH/ 100 ml./10min.)=
$$\frac{\text{Sum of the peak heights} \times \text{constant}}{\text{Peak height of 1 }\mu\text{g. NADH standard}}$$

The peak heights of 1 mg. NADH standard is determined by analysis of the wells loaded with one microliter of NADH (1 mg./ml.) as described above. It should be noted that, at the present time, different lots of NADH vary in their fluorescent efficiency. This foregoing formula is satisfactory if the NADH is uniform in this respect, but if it is not, each lot may be calibrated against a uniform fluorescent standard and appropriate corrections may be made.

The above-described method of accurately quantitatively measuring LDH isoenzymes is much simpler than prior art methods. With my novel method the film of reagent spread over the thin electrophoretic gel rapidly diffuses therethrough and is uniformly distributed therein for complete chemical reaction with the electrophoretically separated serum enzymes. The novel method provides for rapid and accurate analysis of the serum enzymes and isoenzymes. It will be understood that the novel determination of isoenzymes of lactate dehydrogenase does not depend upon the electrophoresis of an antigen solution with the serum to be analyzed as described in the above-mentioned copending patent. That is, the serum enzyme analysis may be made on serum which has been electrophoretically separated without electrophoresis of an adjacent antigen solution. In this case, the wells 29a along the edge of the gel 28 would not be used during the electrophoresis process and the NADH (1 mg./ml.) may be placed in these outer wells in the course of performing the novel serum enzyme analysis described above.

Figure 8:
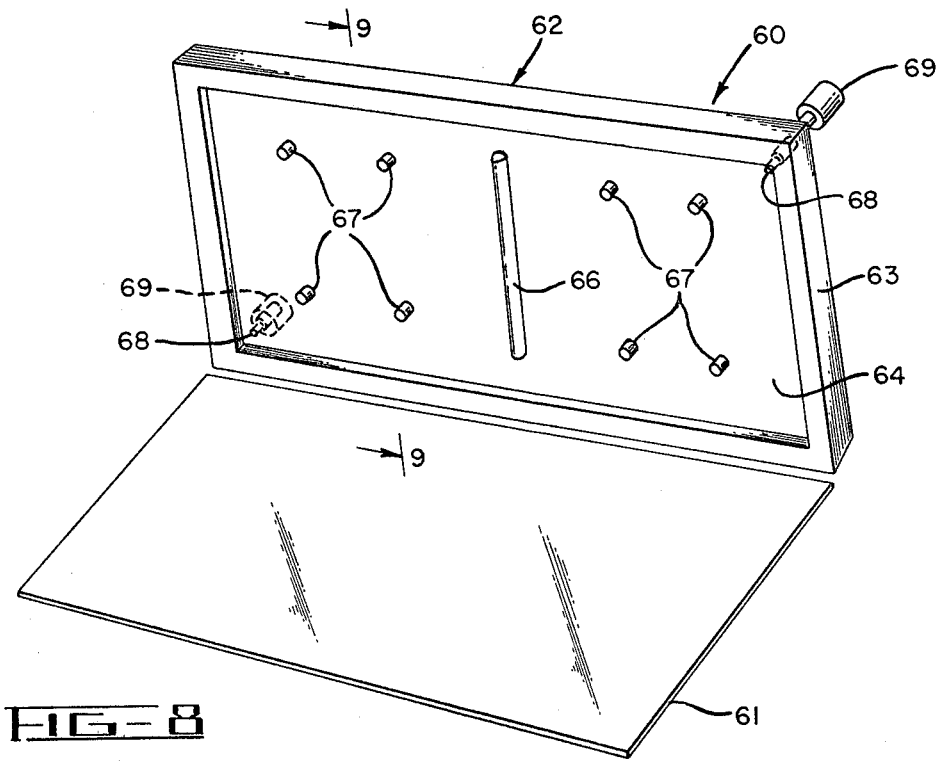
FIGURE 8 is a perspective view similar to that of FIGURE 1 but of a different type of mold which produces a thin, permeable film of gel as in FIGURE 4 but with certain modifications which adapt it for use in the radial diffusion-precipitin technique.

Referring now to FIGURES 8 to 12, and preliminarily to FIGURE 8, an apparatus is there shown which is generally similar to that of FIGURE 1 and is designated by the reference numeral 60 and which is a two-part mold as in FIGURES 1 and 2 but with certain modifications. The mold sections are designated as 61 and 62 and they may be made of the same material as the mold sections 11 and 12 shown in FIGURE 1. Preferably, although not necessarily, the mold section 62 is rigid and the mold section 61 is flexible, such relative rigidity and flexibility being suitably accomplished by making the section 62 of relatively thick plastic material and the top section 61 of relatively thin plastic material. The rigid mold section 62 is formed with a rim 63 which extends entirely around the periphery and which defines the thickness of mold cavity 64. The rigid mold section 62 is also formed with upwardly extending projections or risers 67 and with one or more spacer ribs 66. The ribs 66 have the same height as the rim 63, i.e., they are equal to the depth of the mold cavity 64, and they provide additional support for the flexible mold section 61 and ensure the production of a film of uniform thickness. Alternatively or in addition to the spacer ribs, some of the risers 67 (described below) may extend to the plane of the upper edge or rim 63 and perform the same function.

In the selection of materials of construction of the mold parts, that is the mold sections 10 and 11 of FIGURE 1 and the mold sections 61 and 62 of FIGURE 8, certain desiderata are set forth above. It is in order to amplify these desiderata.

The mold section 10 (FIGURE 1) and 62 (FIGURE 8)—that is, those parts of the apparatus which define the mold cavity and which, in most embodiments of the invention, also form sample-receiving wells, etc.—are preferably rigid and they may be opaque or transparent. The optical properties of these mold parts are not as important as the optical properties of the opposing mold sections 11 and 61 in certain cases because the sections 10 and 62 are discarded at the time of use. However, it is preferred that the mold sections 10 and 62 be transparent because that enables one to inspect the apparatus when filled with gel to determine whether there has been complete filling of the mold cavity with the gel.

With respect to the mold sections 11 and 61 (that is, the sections which are flexible and which are stripped from the other sections with a film of gel adhering to them) optical properties are more important but will vary according to other factors.

Thus, if the apparatus is to be used in a fluorometer having a drum to which the film of gel and its supporting base are attached, it is preferred that the mold section 11 be quite flexible so as to be easily bent around the cylindrical surface but with fluorometric or other optical reading devices which use specimens in flat condition flexibility is not as important, although some flexibility is preferred in any case to facilitate peeling the mold section 11 or 61 from the mold section 10 or 62. With regard to optical properties, transparent material may be used and is preferred in certain situations. For example, if in the measuring technique that is employed, light passes through the film of gel and its base to a detector such as a photocell, the base supporting the film should be transparent. Where, however, the measuring technique does not require passage of light through the base, for example, in some types of fluorometry and in radio-isotopic measurements, the radiation that is measured is emitted radiation and an opaque background is permissible and may, in fact, be preferred.

Figure 9:
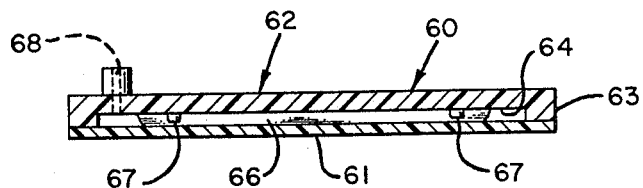
FIGURE 9 is a cross sectional view, taken along the line 9—9 of FIGURE 8, but with the mold sections assembled.

Referring to FIGURE 9, the mold sections 61 and 62 are assembled as shown and a gel, e.g., any of those mentioned above in connection with FIGURES 1 to 7, is poured in through one of the holes 68. Displaced air is vented through the other hole 68. The mold cavity 64 is completely filled. The mold apparatus may be placed in a press and allowed to cool to harden the gel.

The adjacent surface of flexible mold section 61 (hereinafter referred to as the base 61) is adherent to the gel whereas the inner surface of the rigid mold section 62 including the ribs 66 and risers 67 are non-adherent, e.g., by reason of being coated with a release agent such as a silicone. Therefore the rigid mold section can be stripped from the gel after it has hardened.

Figure 10:
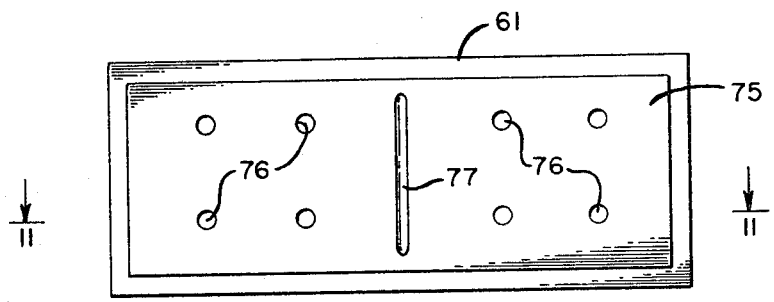
FIGURE 10 is a plan view of the film produced by the apparatus of FIGURES 8 and 9 supported on one of the mold sections.
Figure 11:
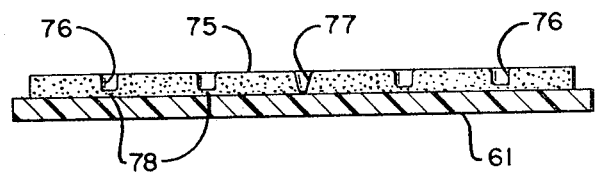
FIGURE 11 is a section taken along the line 11—11 of FIGURE 10.

Referring now to FIGURES 10 and 11, the film of gel formed on and adhering to the base 61 is indicated by the reference numeral 75. Wells 76 are formed in this gel, such wells being cylindrical and of uniform diameter. Slot 77 is formed by rib 66. As shown in FIGURE 11, each of the wells 76 is separated by a thin layer of film 78 from the base 61. The apparatus of FIGURE 8 is designed so that the film 75 is quite thin, e.g., less than 1 mm. and preferably about 0.3 to 0.5 mm., and it is designed so that this thickness is quite uniform.

The apparatus shown in FIGURES 10 and 11 can be employed to great advantage in the radial diffusion-precipitin technique. This technique is described by Stiehm and Fudenberg in a paper entitled "Serum Levels of Immune Globulins in Health and Disease: A Survey," published in Pediatrics, vol. 37, No. 5, May 1966, pages 715 to 727. As there explained, a glass plate was coated with a uniform, two millimeter thick layer of agar-antibody mixture. The antibody used by these authors was a rabbit antiserum to human $\gamma G$, $\gamma M$, and $\gamma A$ globulins. After the layer of gel had hardened, wells were punched in it and uniform samples of abnormal serum under investigation were placed in some of these wells. A standard serum was placed in other of the wells. The plates were submerged in mineral oil for six days at 37° C. and were then rinsed and stained. The staining resulted in visible rings resulting from the precipitin reaction between the specific antiserum and antigen. The areas of these rings were directly proportional to the concentration of antigen inserted into the respective wells. By inserting known quantities of antigen into certain of the wells, and by measuring the ring diameter resulting from known and unknown quantities of antigen, the unknown can be determined.

Thus, radial diffusion of a suitable material such as an antigen from a circular well into a permeable film of gel which is impregnated with a suitable reactant such as an antiserum, results in the well known precipitin reaction and the formation of a ring which is visible even without staining. For example such rings can be observed and measured in oblique light. By adding known quantities of antigen in certain of the wells, followed by measurement of ring diameters, a quantitative determination of the unknown can be made.

Figure 12:
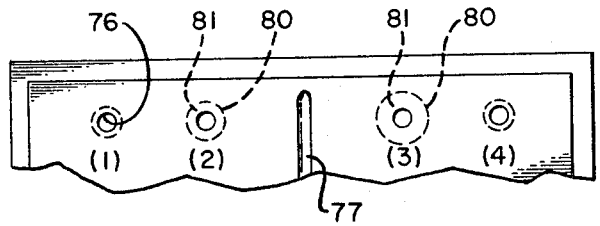
FIGURE 12 is a fragmentary plan view of the film of FIGURE 10 showing how it is used in the radial diffusion-precipitin technique.

Referring now to FIGURE 12, each of the four wells 76 is indicated by a numeral enclosed in parentheses. The precipitin ring around each well is indicated by the broken circle 80, and the area of the annulus 81 between each well 76 and its precipitin circle 80 is a quantitative measure of the amount of active component in the sample introduced in the respective well. For example; assume that well No. (1) is the well to which the unknown has been added and that wells Nos. (2), (3) and (4) are those to which known but different quantities of standard have been added. Using a calibration curve and by comparison of the areas of annulus 81 surrounding well No. (1) with the areas of annuli 81 surrounding wells Nos. (2), (3) and (4), the amount of active component in the sample placed in well No. (1) can be readily determined.

As stated above, the film of gel 75 is very thin, for example about 0.4 mm. in thickness, and it is also quite uniform in thickness. Uniformity of thickness is, of course, important; otherwise the results would not be reproduceable. The extreme thinness of the film is advantageous because, among other reasons, material such as anti-sera incorporated into the film to react with standard and unknown specimens introduced into the wells are oftentimes very expensive. Inasmuch as all or a large part of the film must be uniformly impregnated with antiserum or other reagent, it follows that a film of, say, two millimeters thickness will require much more of this expensive material than a film which is four-tenths of a millimeter in thickness.

Another feature of importance is the fact that the wells 76 do not reach entirely to base 61 but are separated from it by a thin layer 78 of the gel. This is advantageous because if the wells penetrate to the adjacent surface of the base 61, a certain, not insignificant portion of the specimen introduced into the well will creep under the film of gel rather than diffusing into the gel, thereby destroying or impairing the reproducibility and significance of the results obtained.

Figure 13:
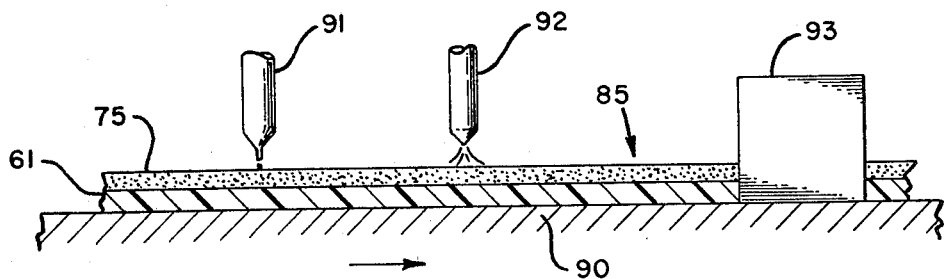
FIGURE 13 is a diagrammatic view showing another embodiment of the invention.

Another embodiment of the invention is shown in FIGURE 13. In this embodiment a length of tape 85 is provided which travels continuously or by increments in the direction shown. This tape consists of a base 61 like that in FIGURES 10 and 11 but in the form of a length of tape. Adhering to the base 61 is a film 75 of permeable gel. This gel, which may be as in FIGURES 10 and 11, may be applied in any manner, e.g., by brushing, squirting, spraying or dipping. It is, however, a thin film as in the case of FIGURES 10 and 11, i.e., preferably not more than about 0.3–0.5 mm. and it is uniform in thickness. Such uniformity can be achieved by various means, e.g., by passing the tape between rollers that are set apart a predetermined distance and which squeeze out excess gel, or a doctor blade may be employed to remove excess gel.

The layer of gel 75 may, if desired, have sample receiving wells formed in it such as the wells 76 in FIGURES 10 to 12. However, there need be no such wells.

The film of gel 75 may be uniformly impregnated with a reagent e.g., by premixing the gel and reagent before applying it to the base 61. The tape is moved beneath a pipette 91 which applies a measured amount of the unknown. If the tape is moved slowly, or if the pipette is caused to undergo a cycle in which it moves forwardly with and at the rate as the tape and moves quickly rearwardly to its starting position, the tape may move continuously. Alternatively the tape may be moved by increments and the unknown added during each pause between increments of forward movement.

Then the tape may be processed (after it has travelled a sufficient distance or has paused long enough for the reaction between reagent and unknown to be completed) in any suitable manner. For example, in the analysis of serum protein, the serum protein is applied by the pipette 91 and any suitable dyestuff such as 8-anilino naphthalene-1-sulfonic acid is applied by means of a nozzle 92. The selected dyestuff is one like 8-anilino naphthalene-1-sulfonic acid which will attach itself to the protein undergoing analysis and in so doing will become fluorescent in proportion to the amount of protein. By this means the amount of protein (the reagent dyestuff being added in excess) can be determined by fluorometry. Other dyestuffs than 8-anilino naphthalene-1-sulfonic acid may, of course, be used provided they function in this manner, i.e., they are non-fluorescent but attach themselves to protein and become fluorescent in proportion to the amount of protein- dyestuff complex. In the case of 8-anilino naphthalene-1-sulfonic acid, it is preferably used in the form of an acid solution, e.g., 30 mgs. of the dyestuff in 100 ml. of 5–10% aqueous acetic acid solution.

If desired a fixing step may be interposed between pipette 91 and nozzle 92 to fix the protein; e.g., a dilute aqueous solution of formaldehyde and perchloric acid may be sprayed onto the are to which serum protein has been applied.

After the reagent has been applied by nozzle 92, after a fixing step (if any) has been carried out and after such period of time as is required for reaction of reagent with the protein to be completed, the tape is passed through a fluorometer 97 which may be provided with a readout to record the value of the determination on a printed tape and/or on a screen.

8-anilino naphthalene -1-sulfonic acid is unstable in aqueous solution if held for any great length of time; it should be used when freshly prepared. This leads to another embodiment of the invention, as follows: A film 75 is provided in the form of a tape as in FIGURE 13, or in any other form in accordance with the present invention. 8-anilino naphthalene-1-sulfonic acid is stable for long periods of time if it is dry. The film 75 is impregnated with this reagent which is then dried, e.g., by application of mild heat and/or vacuum. The reagent is reactivated when moistened, which may be accomplished by dipping the film in or spraying it with water just before use. In many cases the water in the sample of unknown, e.g., blood serum, will serve the same purpose. In general, permeable films, preferably but not necessarily made in accordance with the present invention, may be impregnated with a labile reagent which is stable in anhydrous environment but which is unstable in the presence of moisture, and this film may be dried; stored, shipped and delivered in dry form; and reactivated by adding moisture at or just before the time of use.

Rather than using a tape, a disc may be employed having a base as at 61 and an adhering film of gel, and this disc may be rotated in a turret type of apparatus wherein reagent and/or unknown may be applied at different points and a sector of the disc may rotate through a fluorometer.

In the tape and disc embodiments of the invention the extreme thinness and uniformity of the film of gel are advantageous not only for the reasons previously stated but because the steps involved, moistening, drying, curing, etc. can be accomplished very quickly. If thick layers of gel are employed, the time required for these phenomena may be prohibitive.

In general optimum thickness and optimum uniformity can be determined by criteria such as those mentioned immediately above and elsewhere above. I have found that thickness less than about 1 mm. should be used, preferably not more than about 0.5 mm.; and that departures from average thickness preferably do not exceed about 10%, most advantageously not by more than about 7%.

It will therefore be apparent that novel and very useful analytical apparatus has been provided.

I claim:
1. A disposable film package adapted for electrophoresis comprising:
    (a) an impermeable substantially flat base,
    (b) a thin film of permeable aqueous gel having one surface in adherent contct with said base,
    (c) cover means in contact with the other surface of said film of gel and in edge contact with the base completely enclosing and sealing the film, and
    (d) said film of gel being adherent to said base and non-adherent to said cover means such that when the base is stripped from the cover the film of gel remains adherent to the base.
2. A package according to claim 1 wherein the base is flexible.
3. A package according to claim 1 wherein both the film and the base are transparent.

4. A package according to claim 1 wherein both the film and the base are non-fluorescent.

5. A package according to claim 1 wherein both the film and the base are transparent and non-fluorescent.

6. A package according to claim 1 wherein the cover is provided with well forming projections extending into the film of gel.

7. A package according to claim 6 wherein said well forming projections terminate short of the base.

8. A package according to claim 1 wherein the edge sealing is accomplished by means of a non-hardenable water-resistant adhesive.

9. A disposable film package adapted for electrophoresis comprising:
 (a) an impermeable substantially flat base,
 (b) a thin film of permeable aqueous gel having one surface in adherent contact with said base,
 (c) cover means provided with projecting spacer members and well forming members on one surface thereof,
 (d) said base and cover being assembled with film of gel in between and with the spacer members and well forming members projecting into said film of gel, said spacer members being in contact with said base, and said well forming members terminating short of said base, said cover and base being in edge sealing contact around their entire periphery and thereby completely enclosing the film, said film of gel being adherent to said base and non-adherent to said cover such that when the base is stripped from the cover the film of gel remains adherent to the base.

10. A package according to claim 9 wherein said base is flexible and both the base and the gel are transparent and non-fluorescent.

11. A method of forming a film of permeable gel adapted for electrophoresis comprising:
 (a) providing a flat impermeable base,
 (b) providing a cover for said base having spacer members,
 (c) assembling said base and cover in edge sealing contact with said spacer member projecting toward said base contacting the same and spacing the inner surfaces of the base and cover apart to form a mold cavity, and
 (d) filling said mold cavity with a permeable aqueous gel, said gel being adherent to said base and non-adherent to said cover such that when the base is stripped from the cover the film of gel remains adherent to the base.

References Cited

Bodman, Chromatographic and Electrophoretic Techniques, "Agar Gel, Starch Block Starch Gel & Sponge Rubber Electrophoresis," vol. II, 204–180g. October 1960, pp. 97–105.

Raymond, Clinical Chemistry "A Convenient Apparatus for Vertical Gel Electrophoresis, vol. 8, No. 5, October 1962, pp. 445–464, 469–470, 204–180g.

Raymond et al., "Analytical Biochemistry," Preparation and Properties of Acrylamide Gel for use in Electrophoresis, January 1960, pp. 391–396, 204–180g.

Smithies, Journal of Biochemistry, "An Improved Procedure of Starch Gel Electrophoresis," vol. 71, No. 3, 1955, pp. 585–587, 204–180g.

JOHN H. MACK, Primary Examiner

E. ZAGARELLA, JR., Assistant Examiner

U.S. Cl. X.R.

204—299